United States Patent [19]
Ebbing et al.

[11] Patent Number: 5,544,275
[45] Date of Patent: Aug. 6, 1996

[54] ELECTRICALLY HEATED FLUID CARRYING CONDUIT HAVING INTEGRATED HEATING ELEMENTS AND ELECTRICAL CONDUCTORS

[75] Inventors: Peter F. Ebbing, Los Altos; Peter G. Panagas, Jr., Sunnyvale, both of, Calif.

[73] Assignee: Applied Materials, Inc., Santa Clara, Calif.

[21] Appl. No.: 32,072

[22] Filed: Mar. 17, 1993

[51] Int. Cl.$^6$ .................................................... H05B 3/58
[52] U.S. Cl. .......................... 392/480; 392/479; 392/465; 219/505; 219/535; 219/544
[58] Field of Search ...................................... 392/472–480, 392/481, 478, 468, 479, 465, 485; 219/543, 544, 534, 541, 535, 505

[56] References Cited

U.S. PATENT DOCUMENTS

| | | | |
|---|---|---|---|
| 2,758,150 | 8/1956 | Zargarpur | 392/480 |
| 3,019,325 | 1/1962 | Clouse | 219/300 |
| 3,233,202 | 2/1966 | Kyle | 219/541 |
| 3,582,968 | 6/1971 | Buiting | 219/300 |
| 3,727,029 | 4/1973 | Chrow | 219/301 |
| 3,791,415 | 2/1974 | Lawless | 138/127 |
| 4,371,777 | 2/1983 | Roller | 219/298 |
| 4,429,213 | 1/1984 | Mathieu | 219/301 |
| 4,532,164 | 7/1985 | Claunch, II et al. | 428/36 |
| 4,645,906 | 2/1987 | Yagnik et al. | 219/301 |
| 4,667,084 | 5/1987 | Regge | 219/301 |
| 4,947,012 | 8/1990 | Minarovic | 219/535 |

FOREIGN PATENT DOCUMENTS

| | | |
|---|---|---|
| 0312204 | 9/1988 | European Pat. Off. . |
| 625773 | 1/1936 | Germany . |
| 3900821 | 1/1989 | Germany . |
| 2084284 | 4/1982 | United Kingdom . |
| 2065430 | 11/1990 | United Kingdom . |

OTHER PUBLICATIONS

Raychem Corp.; Chemelex Auto–Trace Self Regulating Heaters (Sales Literature).

*Primary Examiner*—Mark H. Paschall
*Attorney, Agent, or Firm*—Michael A. Glenn

[57] ABSTRACT

An integrated heated conduit includes an inner conduit through which a fluid may be transferred. The inner conduit may also serve as a first electrical conductor, or an insulator may be provided on the outer surface of the conduit and a first electrical conductor may then be formed about the outer surface of this insulator. A polymeric, self-regulating heating element is provided on the outer surface of the first conductor. A second conductor is provided about the outer surface of the heating element to complete a current path across the heating element. The entire assembly may optionally be sheathed in an electrically and/or thermally insulating outer layer.

17 Claims, 2 Drawing Sheets

ELECTRICALLY HEATED FLUID CARRYING CONDUIT HAVING INTEGRATED HEATING ELEMENTS AND ELECTRICAL CONDUCTORS

BACKGROUND OF THE INVENTION

1. Technical Field

The present invention relates to conduits that are useful for transporting fluids. More particularly, the present invention relates to the heating of such conduits to maintain the contents thereof at a constant and/or elevated temperature.

2. Description of the Prior Art

During transport through a conduit, the contents of the conduit may be subjected to a wide range of temperatures, depending upon conduit location (e.g. controlled or ambient environmental conditions), length of the conduit, fluid pressure within the conduit, etc. These variations in temperature can affect the contents of the conduit, such that a vapor component of the conduit's contents may condense, e.g. water condensation may occur.

Such vapor condensation is highly undesirable in most fluid transport applications. For example, the liquid may freeze and disrupt fluid flow within the conduit or even rupture the conduit, causing untold waste and creating serious environmental and health hazards. The liquid or partially frozen liquid may also be transferred through the conduit and into processing equipment, adversely affecting equipment operation, contaminating process constituents, or even damaging the equipment and/or work in progress.

To avoid the problems associated with vapor condensation, it is a common practice in the semiconductor industry, for example, to heat the pipes that are used to transport certain gases to and from processing equipment. The use of heat prevents water vapor from condensing or fleezing, and other undesired effects associated therewith. For example, when water vapor is allowed to condense inside a mass flow controller (MFC) the metering accuracy of the controller is adversely affected. In such event, normal operation of the controller may only be obtained after the MFC is dried out.

Such fluid heating is also helpful to maintain the fluids at a proper temperature, such that state conversion, e.g. from gas to liquid, does not occur. For example, the chemicals that are used in semiconductor processing, including water, may be less hazardous or corrosive in a gaseous form than in a liquid form. For example, $BBr_3$ is corrosive when in liquid form but not corrosive in gaseous form. Thus, it is beneficial to maintain such chemicals at an elevated temperature, at a corresponding unsaturated vapor pressure.

The state of the art for heating a conduit such that its contents are maintained at a constant and/or elevated temperature consists of a heating cable or ribbon, such as is manufactured by the Chemelex Division of Raychem Corporation, Menlo Park, Calif. An example of such prior art heating ribbon is shown schematically in FIG. 1.

The heating ribbon 10 is formed with a conductive polymer in which a self-regulating polymeric heating element 16, made of a polymer mixed with conductive carbon is formed between parallel conductive bus wires 12, 14. This structure is maintained along an entire ribbon length.

Such prior art heating ribbon is often wrapped in an electrically insulating sheath 18. As electrical insulation is usually thermally insulating there is typically some loss of efficiency in heat transfer from the heating ribbon to the conduit. A thermally insulating sheath may also be installed around the conduit, as well as the heating ribbon to prevent heat loss and thus improve heat transfer efficiency.

Such heating ribbons are moderately compliant and flexible and therefore may be wrapped around a conduit or run along the length of a conduit in a manner that somewhat conforms to the shape of the conduit. The heating ribbons are attached to a conduit by special fasteners (tie-wraps, wire, etc.), one placed every few inches, followed by a combination of insulation and metal tape. The heating ribbons are readily powered by any convenient source, usually an AC main power source.

One problem often encountered with known heating ribbons is that of providing uniform heating along a long run of conduit, such that temperature gradients which give rise to vapor condensation or phase conversion are avoided. It has been found in practice that long runs of such ribbons may not consistently contact the conduit's outer surface and, therefore, do not provide uniform and consistent transfer of heat to the conduit. Also, at times the installer may run the heating tape on top of the conduit in lieu of the bottom. This adversely affects heat transfer. Thus, hot or cold spots may result, often exacerbating the problem of vapor condensation or phase conversion. Such inefficient transfer of heat to a conduit also significantly increases the cost of heater operation, and thereby increases overall processing costs.

It is generally recognized that known conduit heating devices, such as the heating ribbon described above, are often difficult to install due to their stiffness. This is particularly true when considering the varying levels of skill different installers possess and the resulting variations in quality of installation. For example, during installation the heating ribbon is often seriously deformed or cut at a conduit corner coupling such that a hazardous condition, as could result in shorting or breach of insulation integrity, is created. That is, the design and manufacturing of ultra clean systems uses weld fittings which have sharp edges. Typical of such fittings are the CAJON MICRO-FIT® weld fittings, supplied by CAJON Company of Macedonia, Ohio. Such heating devices are also difficult to maintain.

SUMMARY OF THE INVENTION

The integrated conduit of the invention comprises an inner conduit for transferring fluids; a first conductor formed thereover for carrying an electrical current; a heating element formed over the first conductor; and a second conductor formed over the heating element. The integrated conduit as described is readily installed in various process applications and assures reliable temperature control for the inner conduit and its contents.

DETAILED DESCRIPTION OF THE INVENTION

Figure 1:
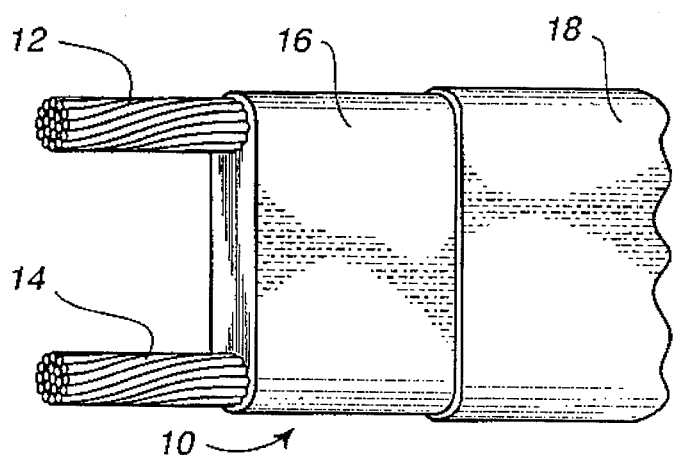
FIG. 1 is a schematic representation of a prior art conduit heating ribbon.

The present invention is best understood by referring to the Drawings in connection with review of this Description. The present invention provides an improved heating apparatus that is integrated with a fluid carrying conduit, and that is useful for heating a fluid within the conduit.

Figure 2A:
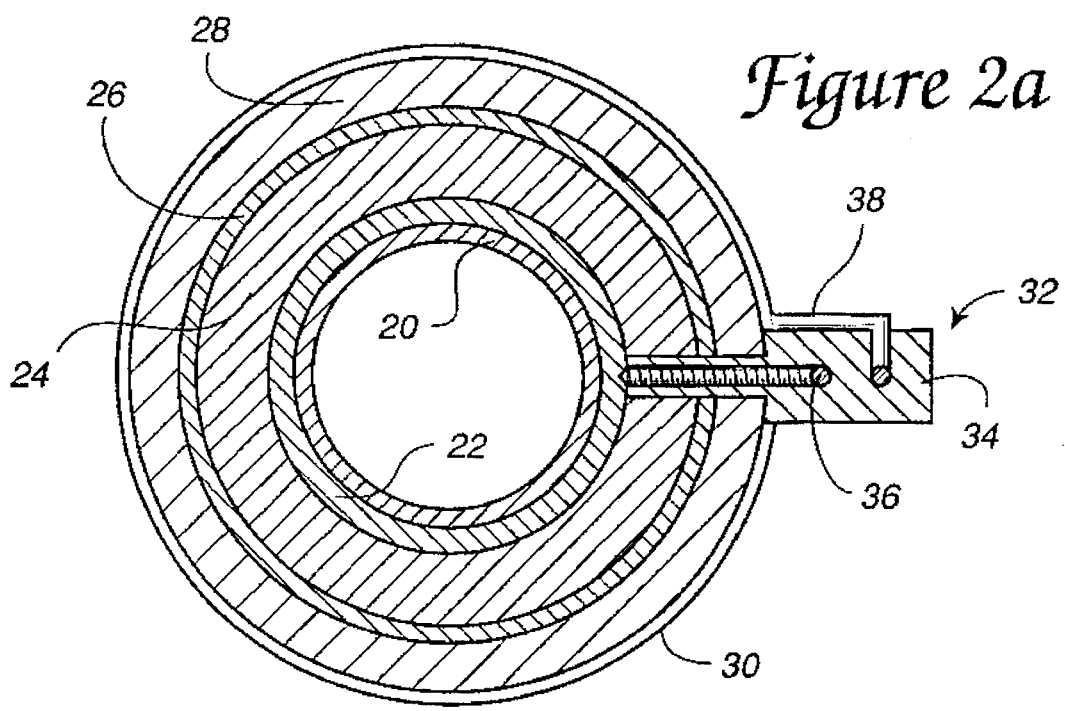
FIG. 2a is a cross sectional view of an integrated fluid transfer conduit and heating element according to the present invention.

In FIG. 2a, a preferred embodiment of the invention is shown in cross section in which a fluid transporting inner conduit 20 is provided. The inner conduit may be formed of stainless steel pipe, such as 316L piping which is useful for highly corrosive or ultra clean applications as may be encountered in semiconductor processing. The inner conduit may also be formed of copper pipe, or any other transport medium suitable to confine and resist a transported fluid. The conduit may have any length as is desired for its application.

Although not necessary as part of the present invention, it is often preferred for safety reasons to include a concentric coaxial electrical insulator 31 (FIG. 3) about the outer surface of the inner conduit. The insulator may be coated, extruded around, or applied to the outer surface of the inner conduit 20 in any other of many known methods and may be formed of any material having good electrical insulating properties. It is also desirable that the material be thermally conductive to permit a maximum transfer of heat through the insulator and to the fluid within the conduit.

A first electrical conductor 22 is formed concentric to and coaxial with the inner conduit 20. The first conductor may be any electrically conductive material, such as braided or wrapped copper or alloy wire, or the inner conduit itself may be used as the first electrical conductor. The purpose of the first conductor 22 is to carry an electrical current to a heating element 24 and it is therefore preferred that the first electrical conductor 22 extend around the outer surface of the inner conduit 20 and along the entire length of the inner conduit 20 to assure continuous electrical contact with the heating element 24.

The heating element 24 is formed concentric to and coaxial with the first conductor 22. In the present invention, the heating element 24 is preferably formed of a polymeric material similar to that discussed above with regard to the prior art. These materials may be coated, extruded around, or otherwise applied to the outer surface of the first conductor. Such materials are designated as self regulating because they act as a variable resistance in response to changes in temperature.

In heating elements of the above type, the actual number of electrical paths provided by the heating element between the conductors which supply current to the heating element changes in response to temperature fluctuations. As the temperature surrounding a heating element cools, the conductive core or fibers contract microscopically. This contraction decreases the electrical resistance of the heating element and opens up numerous electrical path across the heating element, between the conductors. Current flows across these paths to warm the core or fibers of the heating element. As the temperature rises, the core or fibers expand microscopically. This expansion increases electrical resistance of the heating element, and the number of electrical paths across the heating element, between the conductors decreases. Thus, heat output of the heating element is reduced.

For purposes of the present invention, any other heat generating element may be provided. Additionally, it is not necessary that the heating element be self regulating. It is also possible to provide the heating element in any number of configurations, including as a continuous coating around the entire circumference of the conduit, as parallel axial lines, as spiraling lines, or as part of multiple heating elements formed in a multilayer structure, and having appropriate multiple conductors which may be tapped to provide user variable temperature control based on selected tap connection to a power source.

A second conductor 26, having a structure and composition similar to that of the first conductor 22, is provided concentric with and coaxial to the heating element 24 to complete a current supply path across the heating element 24.

It is also desirable but not necessary for purposes of practicing the present invention to include an outer sheath 28. The sheath 28 is preferably an electrical and thermal insulator. It has been found that such sheath is useful to prevent electrical hazards that may be presented by exposed conductors. The sheath 28 is also helpful to improve inefficient operation of the heating element that might otherwise result due to loss of heat.

Figure 2B:
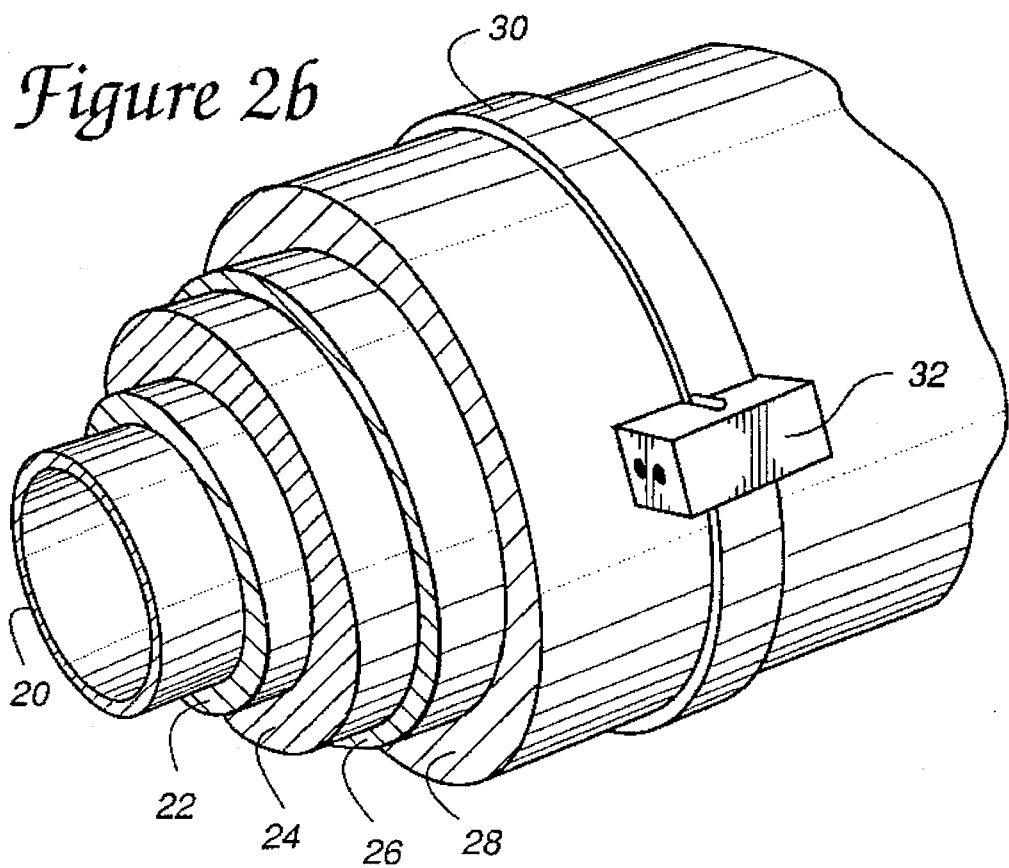
FIG. 2b is a side view of an integrated fluid transfer conduit and heating element according to the present invention.

FIG. 2b is a side view of the preferred embodiment of the present invention. In the figure, the inner conduit 20 is shown disposed within several concentric, coaxial structures, including the first conductor 22, the heating element 24, the second conductor 26, and the sheath 28.

Typically, AC main electrical power is used to operate the heating element. Any voltage generated by any power source as is expedient for the intended application may be provided, although an AC power source is provided in the preferred embodiment of the invention.

To connect the various layers when installing the present invention, the outside layers may be stripped from the ends of each conduit to expose the conductors. The conductors may also be terminated at the conduit source or destination. Connections are made to the conductors as appropriate to supply electrical current to the heating element. When all connections have been made to a first section of the conduit, if multiple sections of conduit are used, jumpers or couplings may be provided to continue current flow to each section.

The preferred embodiment of the present invention includes a power clamp 30 that is useful for coupling a power source to the first and second conductors and thus supply the heating element with power from a power source. The power clamp 30 includes a power terminal 32.

FIG. 2a shows the power terminal 32 in cross section. In the figure, an insulator 34 includes a first terminal 36, for contacting the first or inner conductor 22, and a second terminal 38, for contacting the second or outer conductor 26. Actual contact between terminal 38 and conductor 26 is not shown in FIGS. 2a and 2b. In the preferred embodiment of the invention, terminal 38 may contact outer conductor 26 in a manner similar to that shown for terminal 36 and inner conductor 22. In the alternative, power clamp 30 may itself comprise terminal 38. In such arrangement, power clamp 30 is provided in direct surrounding contact with outer conductor 26, and not surrounding sheath 28, as is shown in FIGS. 2a and 2b.

Although only two terminals are shown in FIG. 2a, it should be appreciated that the power clamp may include any number of terminals as appropriate for the heating structure integrated into the conduit.

Figure 3:
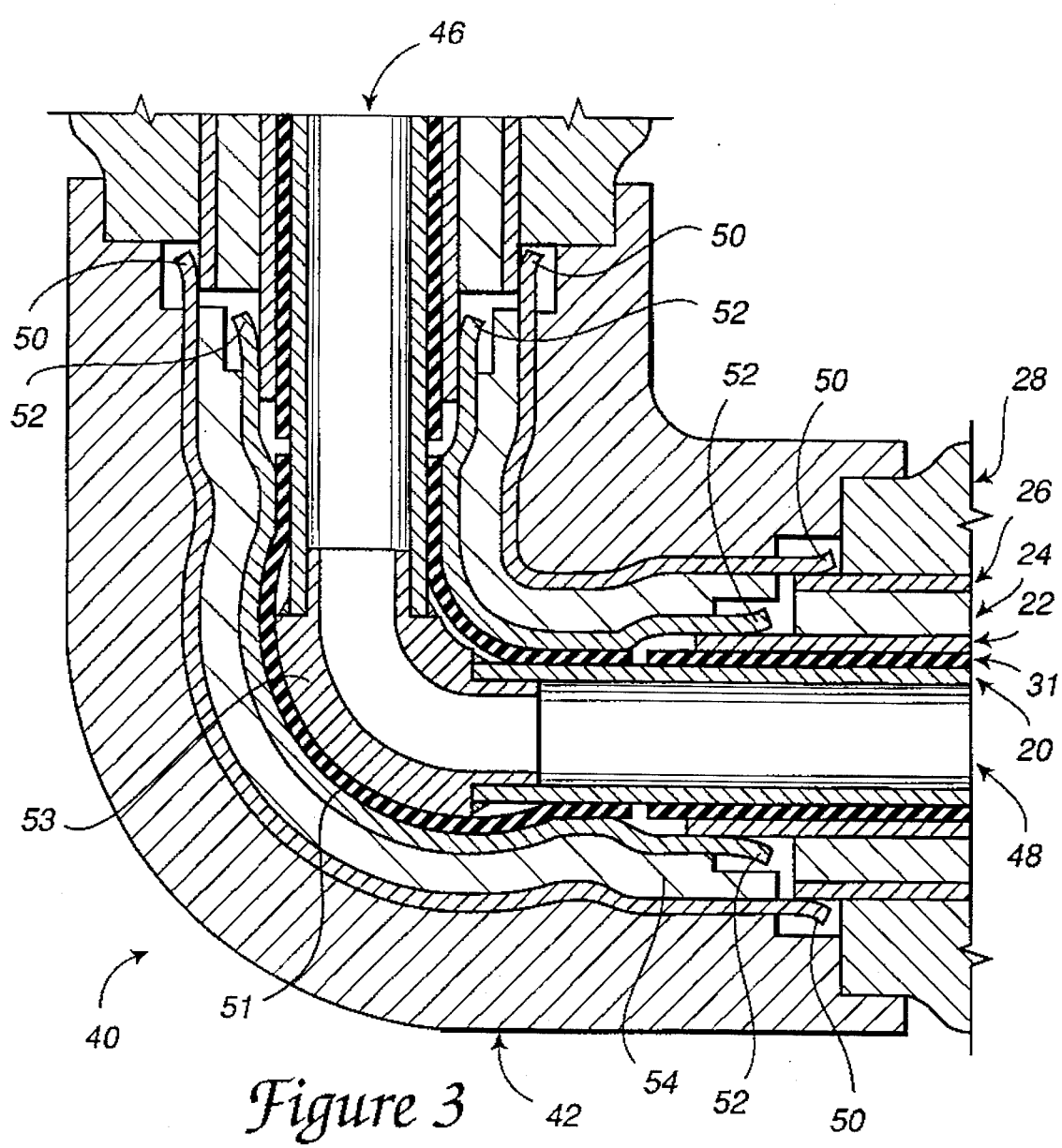
FIG. 3 is a cross sectional view of a corner coupling for use with the integrated fluid transfer conduit and heating element according to the present invention.

FIG. 3 shows a cross sectional view of a corner coupling assembly 40 that may be used with the conduit of the present invention to couple sections of such conduit together at various angles, e.g. a 90° angle. The coupling assembly 40 includes a connector body 42, configured so as to surround the two sections of conduit 46, 48 that are to be coupled together. In the preferred embodiment of the invention, the connector body 42 is made of an electrically and thermally insulating material. As electrical insulators are often good thermal insulators, the selection of such material is a matter of choice. A thermally conductive electrically insulating layer 51 is provided between contact 52 and an inner fluid carrying conduit 53.

The conduit 48 shown in FIG. 3 is of the same configuration as that shown in FIGS. 2a and 2a. That is, the conduit 48 includes a fluid conduit 20 that is surrounded by a thermally conductive electrical insulator layer 31. The fluid conduit 20 is also surrounded by a heating element 24, which is provided between first and second electrical conductors 22, 26. The fluid conduit 20 is also surrounded by an outer thermal and electrical insulator layer 28.

To couple the two sections of conduit 46, 48 together, all layers on each conduit are stripped from the ends of each conduit to facilitate connector welding and electrical interconnection. The conduits are then inserted into the connector, such that the connector surrounds the two conduits. The connections between the two conduits are completed by engagement of spring loaded contacts 50, 52 with the first or inner conductors and second or outer conductors of each of the conduits. A polymer material 54 may also be provided within the coupling assembly to provide a connection between the heating elements within each of the conduits and to maintain even heating of the fluid contained within the inner conduit of such coupling.

Although a coupling assembly for joining two lengths of conduit at a 90° angle is shown in FIG. 3, it is also possible to use such coupling arrangement to couple any number of lengths of conduit in any angle or angular arrangement, e.g. a T-coupling, X-coupling, gang-coupling, etc. may be provided as required by the use to which the conduit is put.

It should be appreciated that the present invention is versatile and lends itself to many different application, including liquid and gas transport, and temperature maintenance and/or elevation. Although a tubular conduit is presented in the figures, the present invention could also be supplied in any number of configurations, including square, rectangular, oval, or other shapes. The present invention may also be provided with conduits having very complex shapes, such as coils, etc., which are extremely difficult to reliably heat with prior art heating techniques.

Finally, the present invention may also be used in a heat reactor, such as is found in a semiconductor fabrication facility. Such reactor is a vessel which is in essence a large conduit that is sealed at each end. This embodiment of the invention replaces the expensive water/glycol system now used to regulate the reactor temperature. In accordance with this application, the present invention is provided in a double walled chamber having a heating element run between the two walls of the chamber, thereby providing a sandwich-like structure. Instead of using a heat exchanger as is taught in the prior art, an electrical current is applied to the two walls of the chamber, which then serve as electrical conductors, and the heating element disposed therebetween supplies the heat necessary for operation of the reactor.

Although the invention is described herein with reference to the preferred embodiment, one skilled in the art will readily appreciate that materials and applications, other than those set forth herein may be substituted for those set forth herein without departing from the spirit and scope of the present invention. Accordingly, the invention should only be limited by the Claims included below.

What is claimed is:

1. A conduit for carrying fluids, comprising:
   an inner conduit for transferring fluids; said inner conduit comprising a first electrical conductor
   a heating element formed concentric to and coaxial with said first conductor and adapted to heat fluids carried in said conduit;
   a thermally conductive electrical insulator located between said inner conduit and said first conductor;
   a second electrical conductor formed concentric to, continuous about, and coaxial with said heating element; and
   a thermally and electrically insulating sheath concentric to and coaxial with said second conductor, wherein said heating element is arranged between said first and second electrical conductors to generate heat in response to an electrical current provided by said first and second conductors.

2. The conduit of claim 1, wherein said heating element is a conductive carbon filled polymeric heater.

3. The conduit of claim 1, wherein said heating element is self regulating.

4. The conduit of claim 1, wherein said inner conduit is formed of a material selected from the group including stainless steel, steel and copper.

5. The conduit of claim 1, wherein said first and second conductors are formed from a braided material.

6. The conduit of claim 1, wherein said first and second conductors are formed from a wrapped material.

7. The conduit of claim 1, wherein said heating element is an extruded material.

8. The conduit of claim 1, wherein said heating element is a coated material.

9. The conduit of claim 1, further comprising:
   at least two heating elements having multiple conductors adapted to be connected thereto, wherein said heating elements and said conductors are arranged to provide a multilayer structure formed about said conduit, and wherein said conductors are tapped to provide user variable temperature control based on electrical current provided to said heating elements by selected tap connections to said multiple conductors.

10. The conduit of claim 1, wherein said heating element is formed in a defined pattern.

11. The conduit of claim 10, wherein said heating element is formed as a linear structure defined by a plurality of parallel axial heating element lines.

12. The conduit of claim 10, wherein said heating element is a spiral structure.

13. The conduit of claim 1, wherein said inner conduit defines a vessel, and wherein said first and second conductors are vessel walls.

14. The conduit of claim 1, further comprising:
   a power coupler, including a clamp circumscribing said conduit, an insulator integral with said clamp, and at least two terminals, a first of said terminals contacting said first electrical conductor and a second of said terminals contacting said second electrical conductor.

15. The conduit of claim 1, further comprising:
   a power coupler including a body for joining at least two conduit segments, said power coupler including at least two contacts, said contacts configured to couple electrical conductors in each conduit segment to electrical conductors in each other conduit segment.

16. In a conduit having an integrated heating element, the conduit including:

an inner conduit for transferring fluids;

a first electrical conductor formed concentric to, continuous about, and coaxial with said inner conduit;

a heating element formed concentric to and coaxial with said first conductor and adapted to heat fluids carried in said conduit;

a thermally conductive electrical insulator located between said inner conduit and said first conductor; and a second electrical conductor formed concentric to, continuous about, and coaxial with said heating element;

a power coupler, comprising:
 a clamp adapted to circumscribe said conduit;
 an insulator integral with said clamp; and
 at least two terminals adapted to contact electrical conductors in said conduit.

17. A power coupler for joining at least two conduit segments of the type having an integrated heating element, each conduit segment including:

an inner conduit for transferring fluids;

a first electrical conductor formed concentric to, continuous about, and coaxial with said inner conduit;

a heating element formed concentric to and coaxial with said first conductor and adapted to heat fluids carried in said conduit;

a thermally conductive electrical insulator located between said inner conduit and said first conductor; and a second electrical conductor formed concentric, to continuous about, and coaxial with said heating element;

said power coupler, comprising:
 a body for accommodating said conduit segments;
 at least two spaced, coaxial, concentric contacts, said contacts including flared, resilient portions configured to couple electrical conductors in each conduit segment to electrical conductors in each other conduit segment.

* * * * *